US00RE42401E

(19) United States
(12) Reissued Patent
Pratt et al.

(10) Patent Number: US RE42,401 E
(45) Date of Reissued Patent: May 31, 2011

(54) DOUBLE DIAPHRAGM PRECISION THROTTLING VALVE

(75) Inventors: Wayne L. Pratt, Scottsdale, AZ (US); William Michael Kolarik, Phoenix, AZ (US)

(73) Assignee: Entegris, Inc., Billerica, MA (US)

(21) Appl. No.: 10/722,168

(22) Filed: Nov. 25, 2003

Related U.S. Patent Documents

Reissue of:
(64) Patent No.: 6,321,776
Issued: Nov. 27, 2001
Appl. No.: 09/556,208
Filed: Apr. 24, 2000

(51) Int. Cl.
*F16K 31/44* (2006.01)
(52) U.S. Cl. ..... 137/312; 251/331
(58) Field of Classification Search ..... 137/312; 251/331
See application file for complete search history.

(56) References Cited

U.S. PATENT DOCUMENTS 4,010,769 A 3/1977 De Lorenzo et al.
4,901,751 A * 2/1990 Story et al. ..... 137/312
5,002,086 A * 3/1991 Linder et al. ..... 137/312
5,261,442 A 11/1993 Kingsford et al.
5,294,093 A 3/1994 Huveteau et al.
5,318,272 A 6/1994 Smith
5,476,118 A * 12/1995 Yokoyama ..... 137/599.11
5,791,631 A 8/1998 Martin et al.

FOREIGN PATENT DOCUMENTS

JP 56014678 2/1981
JP 56014679 2/1981
JP 01093674 4/1989

* cited by examiner

*Primary Examiner* — Kevin L Lee
(74) *Attorney, Agent, or Firm* — Patterson Thuente Christensen Pedersen, P.A.

(57) ABSTRACT

A throttling valve assembly actuated by a stepper motor having a double diaphragm seal and integral throttling surface. The throttling surface interfaces to a mating orifice and port arrangement to provide a smooth control regime for various process fluids. Because of the unique design of the flow paths, the fluids will remain in a laminar flow state throughout the throttling range, thus providing smooth and continuous response to the control input. The valve opening to the fluid *is* controlled by a stepper motor through a direct drive mechanism. The embodiment shown here [employees] *employs* all PTFE construction for the wetting parts, but any material could be used that would be compatible with the process fluid. Additional features are minimal capture of the process fluid, free draining, and no metallic parts in close communication with the process fluid.

24 Claims, 5 Drawing Sheets

DOUBLE DIAPHRAGM PRECISION THROTTLING VALVE

Matter enclosed in heavy brackets [ ] appears in the original patent but forms no part of this reissue specification; matter printed in italics indicates the additions made by reissue.

FIELD OF INVENTION

The present invention relates to fluid control devices and in particular to those applications where materials of construction must be compatible with the process fluids and where it is a requirement that minimal volumes of fluids are captured within the valve. Often times the only suitable material meeting these requirements will be PTFE or other Teflon types. Furthermore, these applications often require that no cracks or crevices are present to permanently capture fluids or particulate carried by the fluid. Another requirement where slurries are being controlled is that the fluid should not be subjected to high rates of shear. Lastly, these fluids are often highly toxic and a double containment is necessary for any thin walled barrier in contact with the fluid.

BACKGROUND OF INVENTION

Many forms of throttling valve are found within the field. Viraraghavan describes a valve in patent '530(cited in the references) that that is typical of valves that may, at first, may be deemed to be satisfactory for these applications. However, as is typical in many valve designs the stem must be sealed with o-rings. This introduces both small cracks and crevasses, as well as another material(the o-ring) that may not be compatible with the process fluid. These problems can be solved with diaphragm valves. Linder, in patent '086(sited in the references) describes one such approach. Here a metallic actuation shaft is buried in the flexible diaphragm such that it is susceptible to corrosion from ionic migration from some process fluids. Secondly, this valve contains a large number of parts of metallic content as well as a comparative large volume of fluid should the primary diaphragm fail. Generally valve designs described in the art attack one or two of the problems described, but none approach the whole problem of safely handling highly toxic or corrosive fluids while providing a smooth continues laminar flow in a free draining, low captive volume device.

The throttling mechanisms described in the art contain sharp corners and short flow paths to control the flow. Many fluids are both hazardous and suffer detrimental effects to sheer effects when flowing around such obstructions. The slurries used in the semiconductor industry are known for their sensitivity to shear. It is generally known in fluid mechanics, that laminar flow is achieved for Reynolds numbers of less then 2000. Where the Reynolds number is computed as follows:

$$Re=Dv\rho/\mu_e$$

Where D is the height of the flow channel, v the fluid velocity, ρthe density, and $\mu_e$ the fluid viscosity. Furthermore, the pressure drop, ΔP, along the channel is expressed differently for laminar flow [that] *than* for turbulent flow which occurs [and] *at* higher Reynolds numbers.

$$\text{For Laminar flow: } \Delta P=K(\mu Lv/D^2)$$

$$\text{For turbulent flow: } \Delta P=K'(UD)(v^2)$$

Where K and K' are constants of proportionality that depend on the engineering units selected. It can be clearly seen that the pressure drop, hence, the throttling effect on the flow stream is a linear relationship to the fluid velocity for laminar flow and a velocity squared relationship for the turbulent flow case. Obviously the ideal case is a linear relationship of pressure loss to flow velocity across the throttling range. A less desirable situation is the square law response where the response of the valve continuously varies over the throttling range. Any configuration that results in the flow response being linear over a portion of the range and transitioning to square law at some point will have a detrimental effect on the ability of the controller to smoothly regulate the flow. In [additions] *addition,* since both relationships contain the length factor L in the numerator it is desired to have some length to the throttling path.

In order to provide a throttling effect it is necessary to control the opening of the fluid channel. Many means are described in the art. These are typically motors, solenoids, compressed air, or manual adjustment devices. The applications envisioned herein all contain a flow meter to measure the flow and advanced electronics to position the valve to [achieved] *achieve* the desired mass or volumetric flow rate. Thus, the position of the valve is not so much of interest as is the results measured by a suitable flow meter. However, in such feed back arrangement the valve undergoes continuous repositioning, and therefore must have a reliable drive mechanism with little or no backlash. Furthermore, as the fluids may be under pressures up to 100 psi the drive mechanism must operate with a wide range of axial loads. Generally drive mechanisms described in the references were judged as incapable of continuous repositioning, or would exhibit excessive backlash detrimental to smooth fluid control. A second feature found to be overlooked in the current art is the ability to remove the drive mechanism and inspect it without the risk of opening the fluid path.

Reviewing the references cited we find that none of them attempt to solve the full range of the problems posed herein.

SUMMARY OF INVENTION

A free draining fluid path with minimal internal volume and no cracks or crevasses and free of sharp corners is achieved by this invention. Furthermore, the invention provides a smooth throttling path of some length and double containment for the process fluid retained by the thin walled diaphragm. The valve body is machined from a solid block of homogenous material. In this embodiment it is Teflon (PTFE), but could be anything compatible with the anticipated process fluid. An inlet directs the flow stream to an island within the fluid cavity of the valve. A moveable diaphragm and integral throttling surface is a female match to this island. Thus, when the diaphragm is extended and the throttling surface mates with the island the flow stream is shut off from passing through the valve. As the diaphragm is retracted from the closed position the fluid will flow through the gap between the throttling surface mating form and the island into the valve cavity. From the cavity it passes unimpeded to the outlet of the valve body.

The diaphragm is a thin walled flexible membrane sufficiently flexible to be capable of seating down on the island to close off the flow path and progressively retracted from the island to offer decreasing resistance to fluid flow. The diaphragm is designed to be flexible but sufficiently strong enough to with stand fluid pressures up to 60 psi with adequate safety margin. In order to provide safety a secondary diaphragm of similar design is captured immediately above the primary diaphragm. A threaded stem on the upper side of the primary diaphragm provides a means to capture the two diaphragms with a threaded drive shaft. Both diaphragms are machine from Teflon(PTFE) or other suitable material to be compatible with the process fluid. This threaded drive shaft is made from Hastelloy C22. Hastelloy has been chosen for its corrosion resistance. This is an added precaution due to the fact that many corrosives, such as Hydrochloric Acid will produce ions that can leach through Teflon over time. The threaded drive shaft has internal threads for locking the diaphragms and external threads for interfacing with the rotor.

Both diaphragms have squared off shoulders at their periphery. These squared off sections are sized such that when the drive housing is tightened onto the valve body the fluid is sealed within the fluid cavity. A weep hole is provided from the out side of the valve body to the space between the two diaphragms. This, along with a radial canal just outside the diaphragm seals, provide a means of detecting a leak in the primary diaphragm.

The rotor is fixed in position by thrust bearings captured between the rotor and the drive housing. The rotor is free to turn under all vertical loads, and will position the drive shaft, and diaphragms down onto the flow island to close the flow path, or re positioning the diaphragms in the upward direction, to progressively open the path to fluid flow. The lower bearing assembly is the smaller of the two. Its only function is to produce a small vertical pre load on the rotor. Since all positive fluid pressures will be in the same direction the pre load is only set so that at zero, or slightly negative fluid pressures, the rotor will still have some vertical loading. The vertical load on the rotor will increase directly with fluid pressure. At 60 psi this load will be 105 lbs. The large bearing assembly is sized to take this loading with a conservative margin. Thus the rotor is free to turn under all anticipated loads. Furthermore, the loading will be in the same vertical direction under all anticipated circumstances minimizing backlash.

The top of the rotor has a slot cut in it to receive a plastic insert of moderate hardness. This insert also contains a slot that matches a tab machined on the drive shaft of the motor. There is a slight interference in the fit of the motor tab and the plastic insert. The reason for this is that the motor in modulating the flow under the command of a remote electronic system will be undergoing constant reversals. This interference assures that the slot and tab will not have any backlash or create excessive noise or wear during operation.

The motor is affixed to the top of the drive housing and connects directly to the rotor as described above. The motor in [this] *the preferred* embodiment is a standard frame [17] stepper motor, but may be any suitable drive device, such as a DC motor, AC motor, *or* servo motor. It may be desirable for the electronic system to be able to receive feedback on the position of the diaphragms. This is accomplished by attaching a switch of optical or mechanical means to a threaded drive shaft attached with a coupling to the rear shaft of the motor. This threaded shaft will drive a cam in the vertical directions. The switch and cam are arranged so that when the valve is closed to fluid the switch will also be closed. This feedback signal can be used by the controlling electronics, if necessary to sense the closed position. Alternatively, a potentiometer or other encoder may be so attached to provide continuous feedback to the controller.

The valve assembly described above is then housed in an outer housing of suitable material for the environment of the anticipated application.

DESCRIPTION OF DRAWINGS

There are five drawings referred to herein.

DETAILS OF INVENTION

Figure 1:
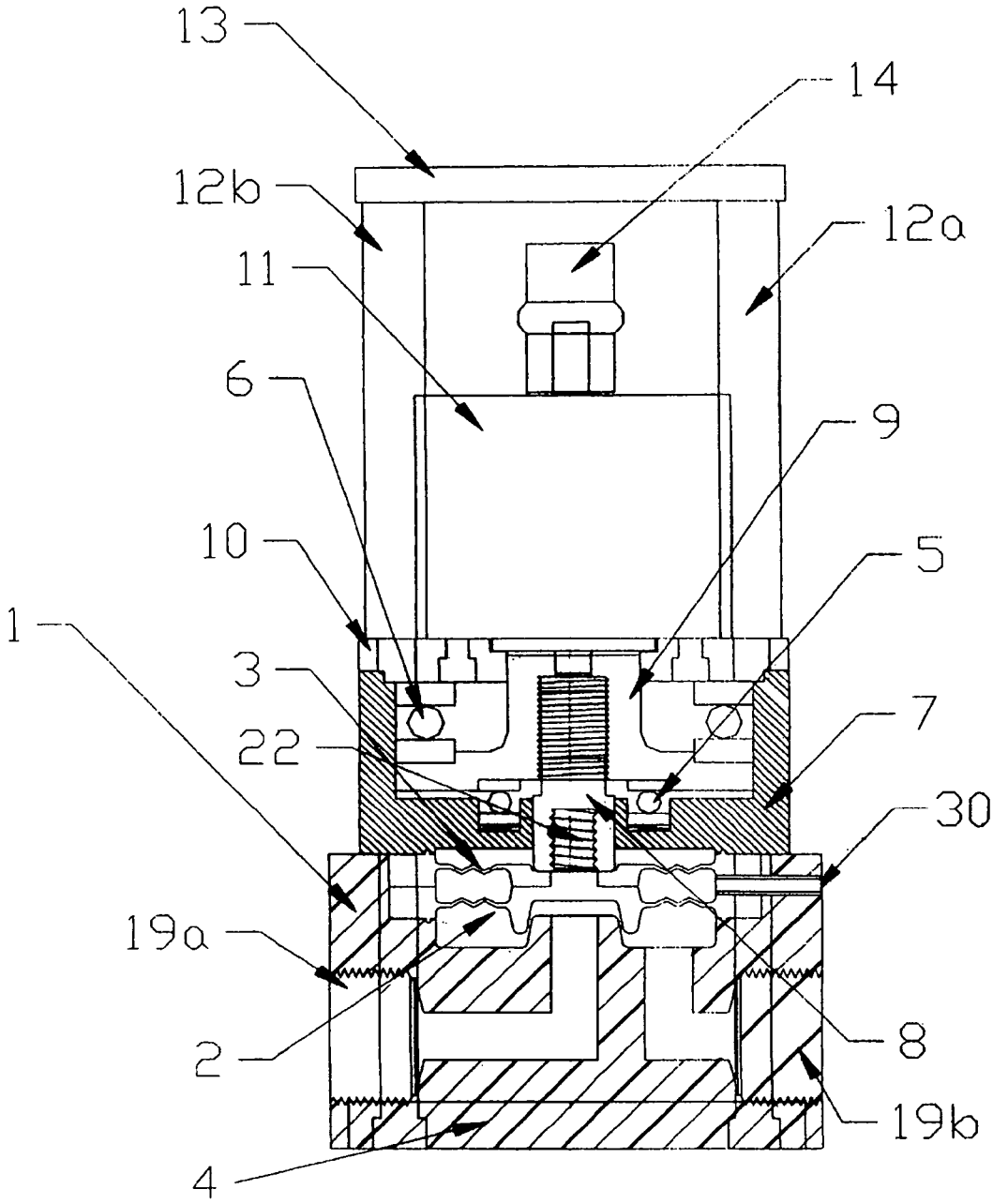
FIG. 1 is a cross section through the center of the valve assembly in the plane of the flow path.
Figure 2:
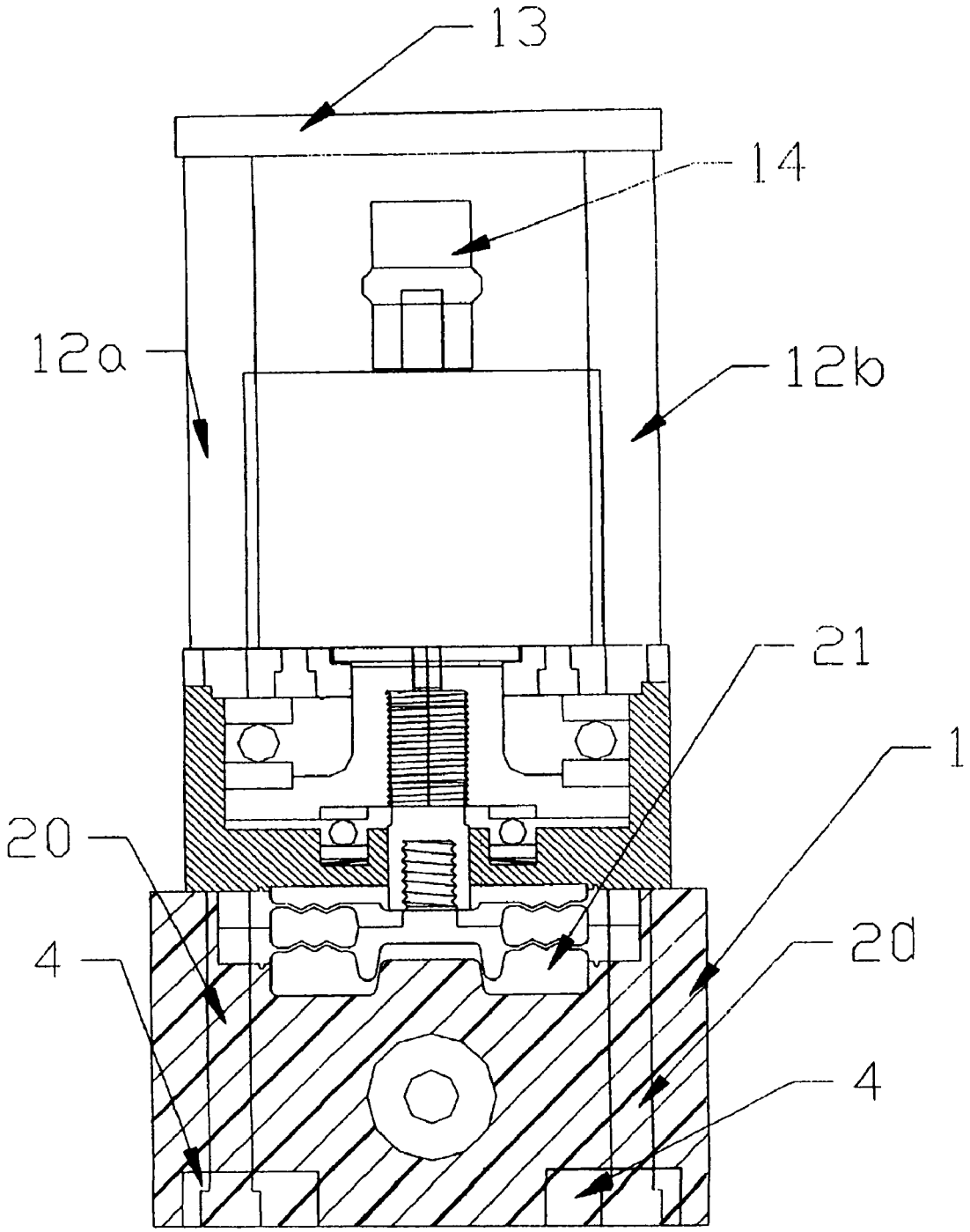
FIG. 2 is a cross section through the center of the valve assembly perpendicular to the plane of the flow path. The switch/encode that maybe optionally installed has been left out of these illustrations.
Figure 3:
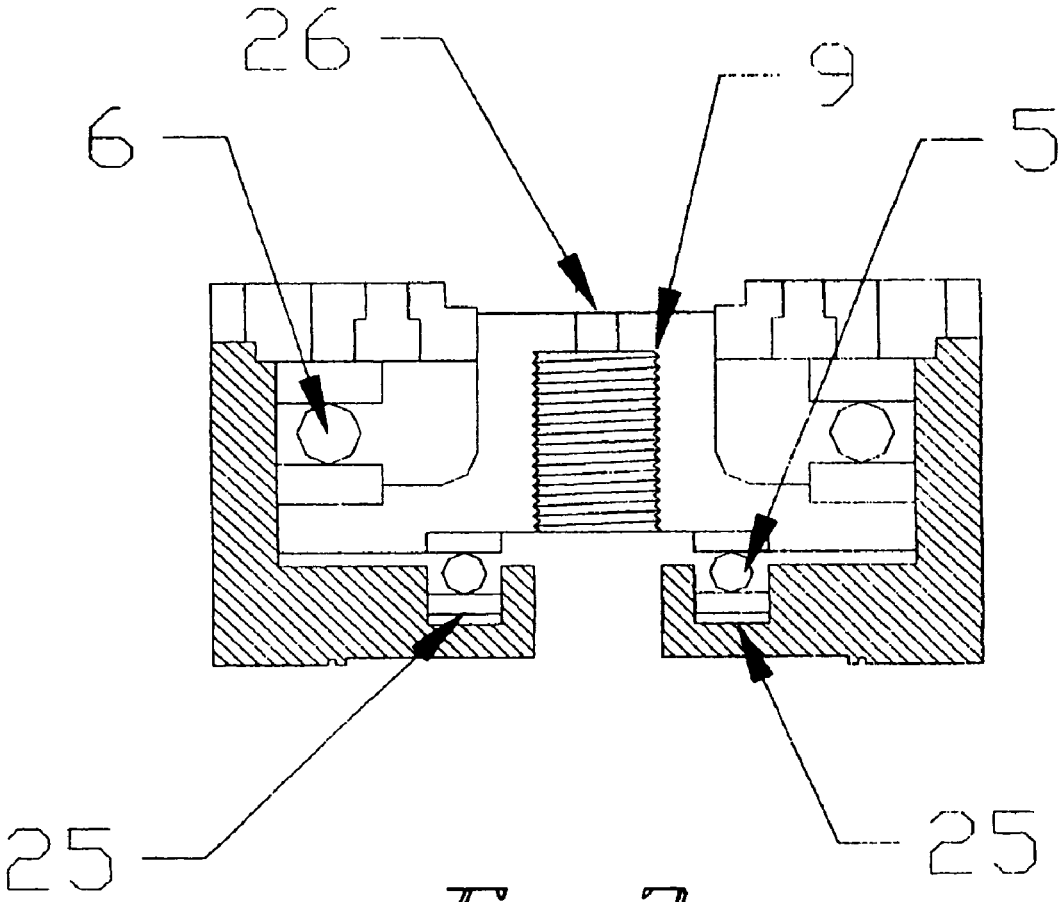
FIG. 3 is a cross section, in either plane described in FIGS. 1 and 2 of the drive housing and internal components.
Figure 4:
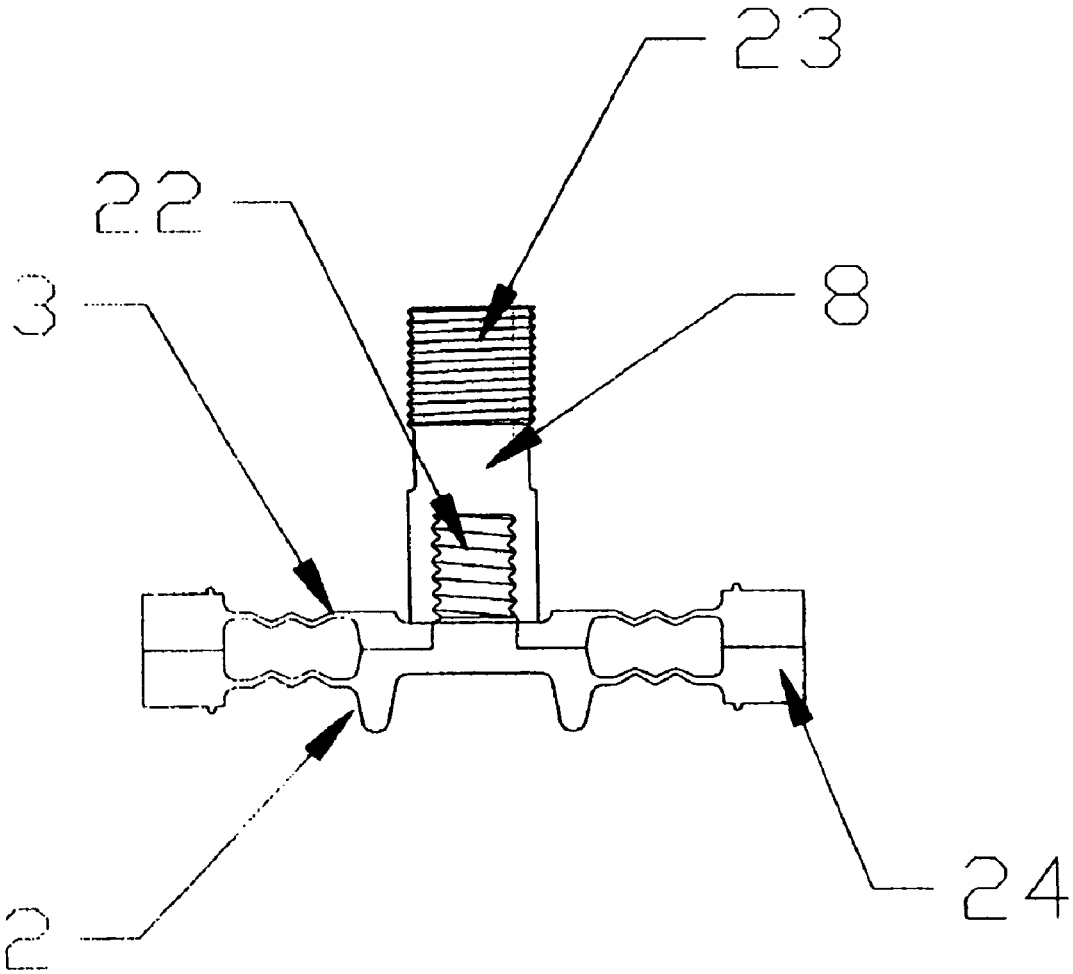
FIG. 4 is a cross section of the double diaphragm and drive shaft. Finally.
Figure 5:
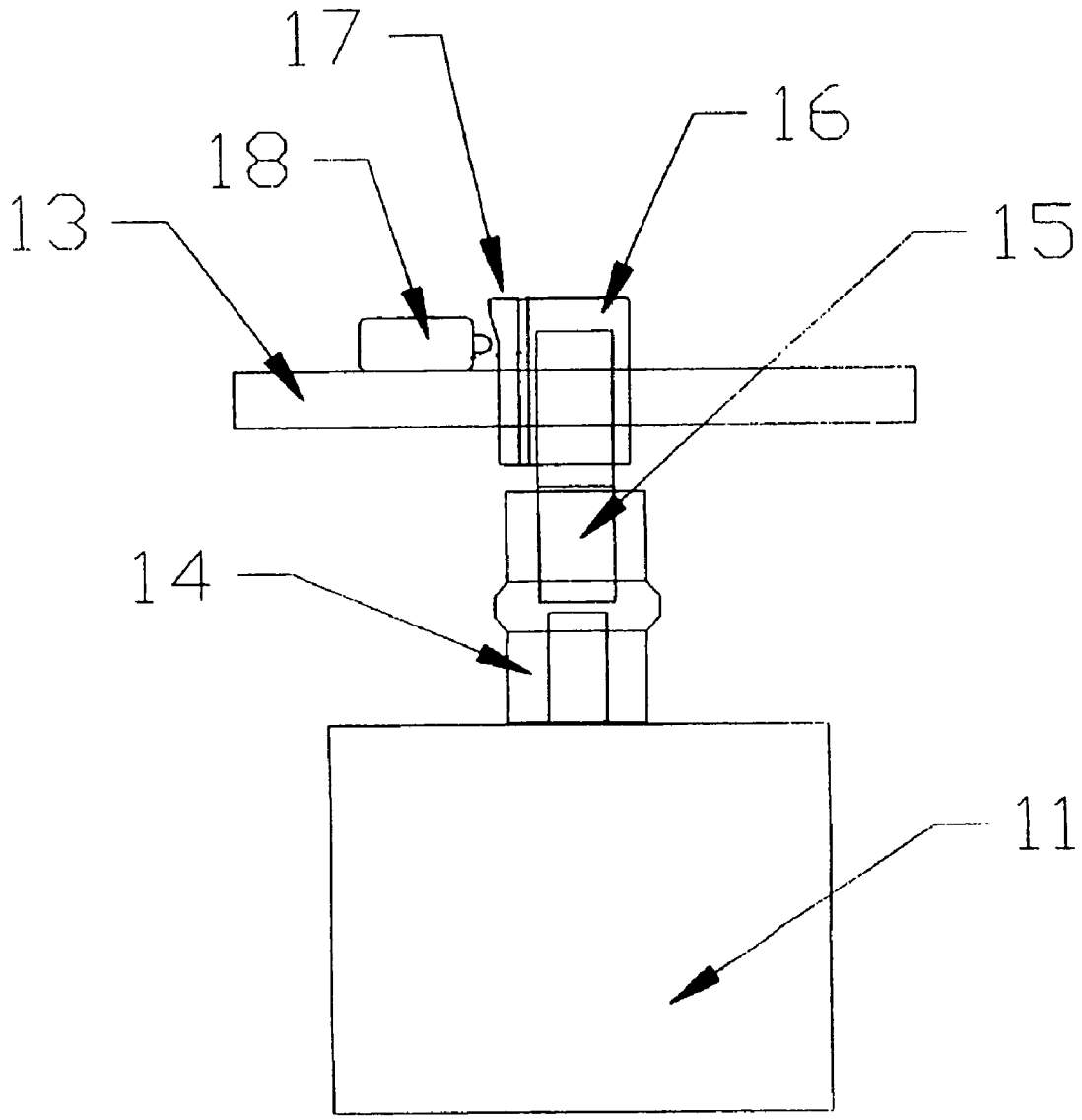
FIG. 5 is a cross section of the motor and optional encoder. In this case the encoder is a switch providing a contact closure when the diaphragms are in the closed position.

The inlet 19a provides a threaded coupling to the users process fittings and communicates the fluid though to the integral diaphragm and throttling surface 2. From this point the fluid flow is controlled into the inner valve cavity where it is then free to flow to the exit port 19b. The valve body 1 is made from a solid block of Teflon(PTFE, in this case). The primary diaphragm 2 and back up diaphragm 3 are pinched and held in place by the drive housing 7. The drive housing is firmly attached to the valve body as described below. Sealing is accomplished without the need for o-rings by slightly over sizing the shoulders of the two diaphragms 24. The primary diaphragm has the throttling surface machined onto the lower side and a threaded stem 22 machined onto the upper side. This throttling surface is the female form of the discharge island. The threaded stem is used to connect to the drive shaft 8 as well as pinch the backup diaphragm 3 onto the primary diaphragm 2. The drive shaft 8 is made from Hastelloy C22 well know for it corrosion resistance. Although the drive shaft is isolated from the process fluid by both Teflon(PTFE) diaphragms it can be corrosively attacked by ions leaching through the Teflon.

The drive housing 7 is held to the body 1 by through bolds 20. In order to carry the compression load of the bolts two metallic holding bars 4 are provided. All of these metallic components are isolated from the fluid by considerable distances of Teflon. The drive train consists of a small thrust bearing 5 and wavy spring 25 that provide vertical pre load on the rotor 9. The rotor 9 drives the threaded drive shaft to position the diaphragms and thus controls the gap in the throttling surfaces. The large diameter thrust bearings 6 take the vertical load imposed by the fluid pressure onto the diaphragms and the connected drive assembly. This loading will be a maximum of 105 pounds for 60 psi of fluid pressure. A stepper motor 11 is fitted to the top of the drive housing and couple directly to the rotor 9 via slot in the rotor 26 and matching tab machined onto the motor drive shaft.

The motor mounts on top of the drive housing 7 mating with the housing lid and using the 4 bolt pattern of the motor mount to affix the motor and lid to the housing. The motor 11 and housing 7 are then secured to the valve body 1 by the 4 through bolts 20 and holding bars 4. Two threaded spacers 12a and 12b may be substituted for the motor mounting bolts for mounting the optional encoder/position switch 18 and actuating mechanism 16, 17. In this case a coupling 14 is used to attach threaded encoder shaft 15. This shaft drives the threaded bushing 16 in and attached cam 17 in the vertical direction corresponding with the position of the diaphragms as positioned by the motor and direct connection to the rotor at the other end of the motor drive shaft. The position may be adjusted so that when the diaphragms and integral throttling surface are closed down on the discharge island the switch will be closed. Alternately, the threaded shaft 15, bushing 16, and cam 17 maybe replaced with a potentiometer, or other suitable encoder.

What is claimed is:

1. A free draining throttling valve comprising:

(a) a valve body defining an inlet and an outlet;

(b) a *first* throttling surface *positioned* between said inlet and outlet, said *first* throttling surface comprising an island having a generally annular *outer* peripheral surface;

(c) a diaphragm [having] *structure including* a primary [surface] *diaphragm* and a secondary [surface] *diaphragm*, said [surfaces] *primary and secondary diaphragms* being spaced-apart and being joined at peripheral edges to form an internal [diaphragm] volume chamber *in said diaphragm structure*;

(d) said primary *diaphragm having a lower* surface defining a [mating] *second* throttling surface, *said second throttling surface, including an annulus with an inner peripheral surface opposing the outer peripheral surface of said island, at least a portion of said second throttling surface sealingly* engageable with *at least a portion of* said [island] *first throttling surface*;

(e) drive means [on] *operably coupled with* said diaphragm *structure*;

(f) operator means [cooperable] *operably coupled* with said drive means for selectively positioning said diaphragm [between an] *structure in a flow blocking position in which the second throttling surface is sealingly engaged with the first throttling surface, thereby closing off a fluid flow through said valve, and further for selectively positioning said diaphragm structure in a plurality of* open flow control positions in which a throttling gap is established [in which a] *between said first and second throttling surfaces, said throttling gap causing a substantially* linear pressure drop [occurs] *in the fluid flow* with increasing flow velocity [and a flow blocking position in which the primary diaphragm closes off flow at said island].

2. The valve of claim 1, wherein a weep hole extends through said valve body into said [diaphragm] *internal volume* chamber.

3. The valve of claim 1, wherein *said outer peripheral surface of* said island [has] *is* tapered [side walls] and said throttling gap is between said [side walls] *outer peripheral surface* and said [throttling] *inner peripheral* surface *of said annulus*.

4. The valve of claim 1, wherein said drive means comprises a threaded shaft on said diaphragm and wherein said operator means comprises a motor driven rotor in threaded engagement with said drive means.

5. The valve *of* claim 4, *further comprising a drive housing, and* wherein said rotor is mounted in thrust bearings captured between the rotor and *the drive* housing.

6. The valve of claim 1, wherein the valve body is *formed from* a corrosive chemical resistant material.

7. The valve of claim 1, *further comprising a drive housing, and* wherein said [body has an upper and lower section and said] diaphragm *structure* is retained [therebetween] *between said drive housing and said valve body* at said *peripheral* edges [of said diaphragm].

8. The valve of claim 4, wherein the [roter] *rotor* is driven by a stepper motor.

9. The valve of claim 4, wherein said rotor is biased to provide a pre-load to oppose fluid pressure.

10. The valve of claim 1, wherein said *primary and secondary* diaphragm*s* [surfaces] are provided with annular ripples that deform as the diaphragm *structure* flexes.

*11. A free draining throttling valve comprising:*

*(a) a valve body defining an inlet and an outlet;*

*(b) a first throttling surface positioned between said inlet and outlet, said first throttling surface comprising an island having a generally annular outer peripheral surface;*

*(c) a diaphragm structure including a primary diaphragm and a secondary diaphragm, said primary and secondary diaphragms being spaced-apart and being joined at peripheral edges to form an internal volume chamber in said diaphragm structure;*

*(d) said primary diaphragm having a lower surface defining a second throttling surface, said second throttling surface including an annulus with an inner peripheral surface opposing the outer peripheral surface of said island, at least a portion of said second throttling surface sealingly engageable with at least a portion of said first throttling surface; and*

*(e) a drive assembly operably coupled with said diaphragm structure for selectively positioning said diaphragm structure in a flow blocking position in which the second throttling surface is sealingly engaged with the first throttling surface, thereby closing off a fluid flow through said valve, and further for selectively positioning said diaphragm structure in a plurality of open flow control positions in which a throttling gap is established between said first and second throttling surfaces, said throttling gap causing a substantially linear pressure drop in the fluid flow with increasing flow velocity.*

*12. The valve of claim 11, wherein each of the primary and secondary diaphragms have annular ripples that deform as the diaphragm structure flexes.*

*13. The valve of claim 11, wherein the drive assembly includes a drive train operably coupled with the flexible diaphragm structure and an operator operably coupled with the drive train.*

*14. The valve of claim 13, wherein the drive train includes a threaded shaft on the flexible diaphragm structure and a rotor threadedly engaged with the threaded shaft.*

*15. The valve of claim 14, wherein the rotor is rotatably mounted between a pair of thrust bearings.*

*16. The valve of claim 15, wherein the rotor is biased to provide a pre-load to oppose fluid pressure.*

*17. The valve of claim 15, wherein the operator is a stepper motor.*

*18. The valve of claim 11, wherein the body portion is formed from chemically resistant polymer material.*

*19. The valve of claim 18, wherein the chemically resistant polymer material is PTFE.*

*20. A throttling valve comprising:*

*a body portion defining an inlet passage, an outlet passage, and a fluid cavity in fluid communication with the inlet passage and the outlet passage;*

*an upwardly facing valve seat disposed around the inlet passage in the fluid cavity, said valve seat comprising a projecting island having an outer surface with an outer peripheral surface portion;*

*a flexible diaphragm structure having a bottom surface facing into the fluid cavity so as to define the top wall of the fluid cavity, the bottom surface having a valve portion opposing the valve seat, the valve portion defining a recess adapted to receive said projecting island therein,*

*the recess having an inner surface with an inner peripheral surface portion opposing the outer peripheral surface portion of the projecting island, the valve portion being selectively positionable with the flexible diaphragm structure in a flow blocking position wherein the valve portion is sealingly engaged with the valve seat thereby closing off a fluid flow through the valve, the valve portion being further selectively positionable in a plurality of open flow control positions wherein a throttling gap is established between the outer peripheral surface portion and the inner peripheral surface portion, the throttling gap presenting a substantially linear pressure drop in the fluid flow with increasing flow velocity therethrough; and*

*a drive assembly operably coupled with the flexible diaphragm structure for selectively positioning the valve portion.*

*21. The valve of claim 20, wherein the flexible diaphragm structure includes a primary diaphragm portion and a secondary diaphragm portion, the primary and secondary diaphragm portions being spaced-apart to define an internal volume chamber in the diaphragm structure.*

*22. The valve of claim 21, wherein each of the primary and secondary diaphragm portions have annular ripples that deform as the diaphragm structure flexes.*

*23. The valve of claim 20, wherein the body portion is formed from chemically resistant polymer material.*

*24. The valve of claim 23, wherein the chemically resistant polymer material is PTFE.*

* * * * *